United States Patent
Iglesias Cano et al.

(10) Patent No.: US 12,123,322 B2
(45) Date of Patent: Oct. 22, 2024

(54) FIBROUS PREFORM WITH STIFFENERS FORMED BY UNIDIRECTIONAL YARN LAYERS

(71) Applicant: SAFRAN AIRCRAFT ENGINES, Paris (FR)

(72) Inventors: Celia Iglesias Cano, Moissy-Cramayel (FR); Lucas Antoine Christophe Lauwick, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/571,015

(22) PCT Filed: Jun. 7, 2022

(86) PCT No.: PCT/FR2022/051077
§ 371 (c)(1),
(2) Date: Dec. 15, 2023

(87) PCT Pub. No.: WO2022/263743
PCT Pub. Date: Dec. 22, 2022

(65) Prior Publication Data
US 2024/0200459 A1     Jun. 20, 2024

(30) Foreign Application Priority Data
Jun. 17, 2021   (FR) ........................ 2106412

(51) Int. Cl.
*F01D 5/28*     (2006.01)
*B29C 33/52*    (2006.01)
(Continued)

(52) U.S. Cl.
CPC .............. *F01D 5/282* (2013.01); *B29C 33/52* (2013.01); *B29C 70/24* (2013.01);
(Continued)

(58) Field of Classification Search
CPC . F01D 5/282; F01D 5/16; F01D 25/04; F05D 2300/614; B29C 70/24
See application file for complete search history.

(56) References Cited

U.S. PATENT DOCUMENTS 7,101,154 B2 * 9/2006 Dambrine ............... B29C 70/48
442/205
7,128,536 B2 * 10/2006 Williams ............... F04D 29/668
416/500
(Continued)

FOREIGN PATENT DOCUMENTS

CA         2799706 A1     1/2012
CN       102741043 A     10/2012
(Continued)

OTHER PUBLICATIONS

International Search Report as issued in International Patent Application No. PCT/FR2022/051077, dated Sep. 30, 2022.
(Continued)

*Primary Examiner* — Michael L Sehn
(74) *Attorney, Agent, or Firm* — Pillsbury Winthrop Shaw Pittman LLP

(57) ABSTRACT

A fibrous preform of a turbomachine vane or blade includes two fibrous portions formed by three-dimensional weaving and forming an aerodynamic profile of the vane or blade and defining therebetween an interior volume, wherein each fibrous portion has at least one fibrous vibration damping stiffener including one or several unidirectional layers of yarns and present in the interior volume, and wherein the at least one fibrous stiffener is present on a non-interlinked area on which the unidirectional layer(s) of yarns are separated from the corresponding fibrous portion, and wherein the yarns of this or these unidirectional layers are woven with the corresponding fibrous portion outside the non-inter-
(Continued)

linked area, or wherein the at least one fibrous stiffener is added onto each fibrous portion.

11 Claims, 6 Drawing Sheets

(51) Int. Cl.
 *B29C 70/24* (2006.01)
 *B29D 99/00* (2010.01)
 *B29K 105/08* (2006.01)
 *B29L 31/08* (2006.01)

(52) U.S. Cl.
 CPC .. *B29D 99/0028* (2013.01); *B29K 2105/0845* (2013.01); *B29L 2031/082* (2013.01); *F05D 2230/20* (2013.01); *F05D 2300/614* (2013.01)

(56) References Cited

U.S. PATENT DOCUMENTS

| | | | |
|---|---|---|---|
| 9,033,673 B2* | 5/2015 | Roussille | F01D 5/282 416/229 A |
| 9,616,629 B2* | 4/2017 | Fabre | F04D 29/324 |
| 9,957,972 B2* | 5/2018 | Foster | F01D 5/282 |
| 2013/0017093 A1 | 1/2013 | Coupe et al. | |
| 2013/0017094 A1 | 1/2013 | Coupe et al. | |
| 2022/0372882 A1 | 11/2022 | Marchal et al. | |

FOREIGN PATENT DOCUMENTS

| | | |
|---|---|---|
| CN | 102971135 A | 3/2013 |
| EP | 2 781 694 A2 | 9/2014 |
| EP | 3 078 647 A1 | 10/2016 |
| EP | 3 798 418 A1 | 3/2021 |
| WO | WO 91/15357 A1 | 10/1991 |
| WO | WO 2011/083250 A1 | 7/2011 |
| WO | WO 2013/079860 A1 | 6/2013 |
| WO | WO 2021/084192 A1 | 5/2021 |

OTHER PUBLICATIONS

International Preliminary Report on Patentability and the Written Opinion of the International Searching Authority as issued in International Patent Application No. PCT/FR2022/051077, dated Dec. 14, 2023.

GR First Office Action as issued in Chinese Patent Application No. 202280047270.0, dated Apr. 27, 2024.

* cited by examiner

[Fig. 1]
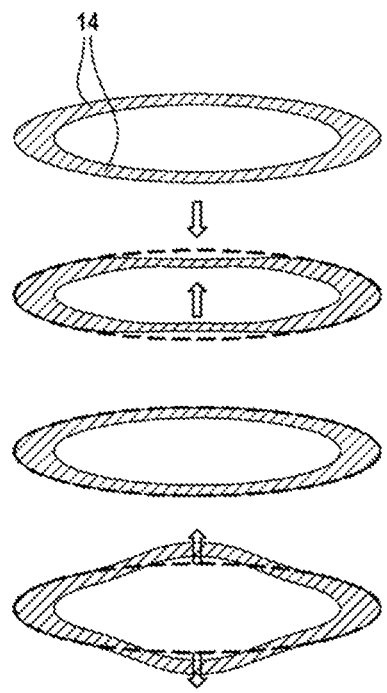
[Fig. 2]
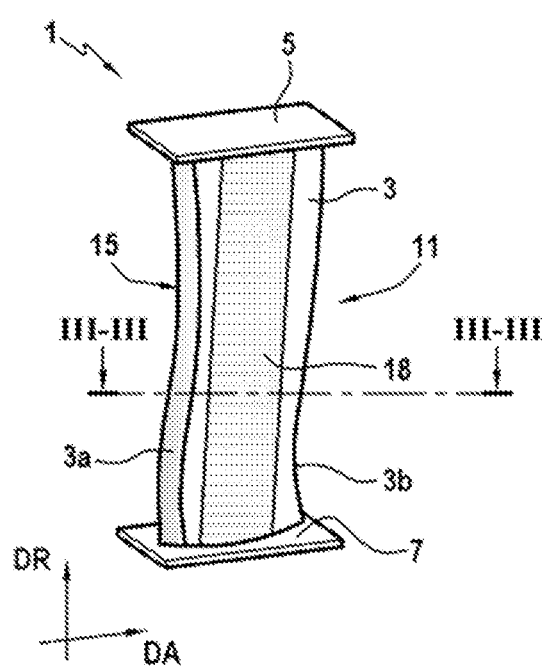

[Fig. 3]
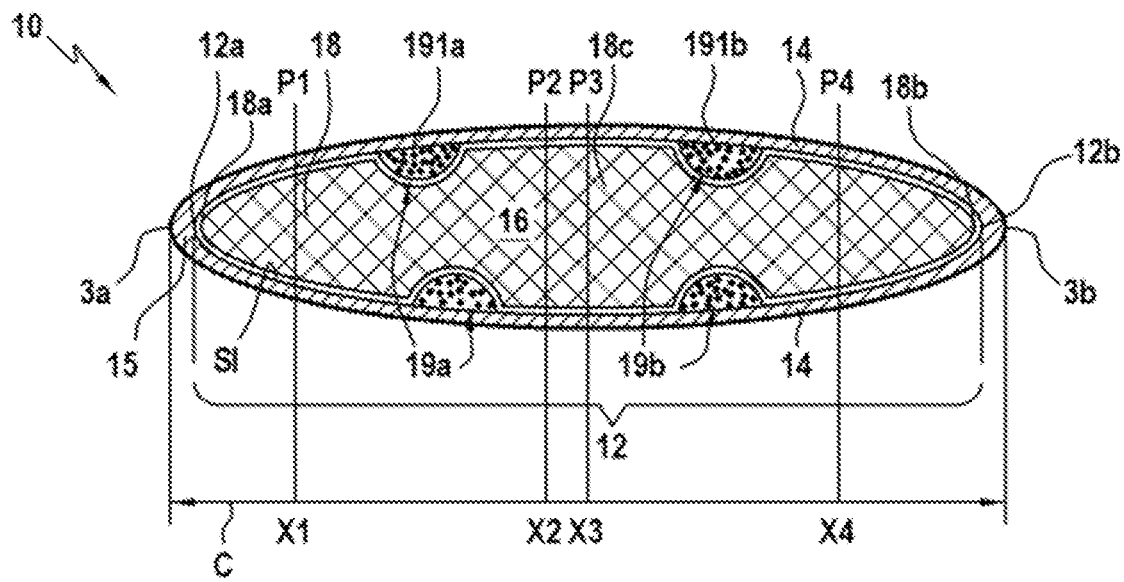
[Fig. 3A]
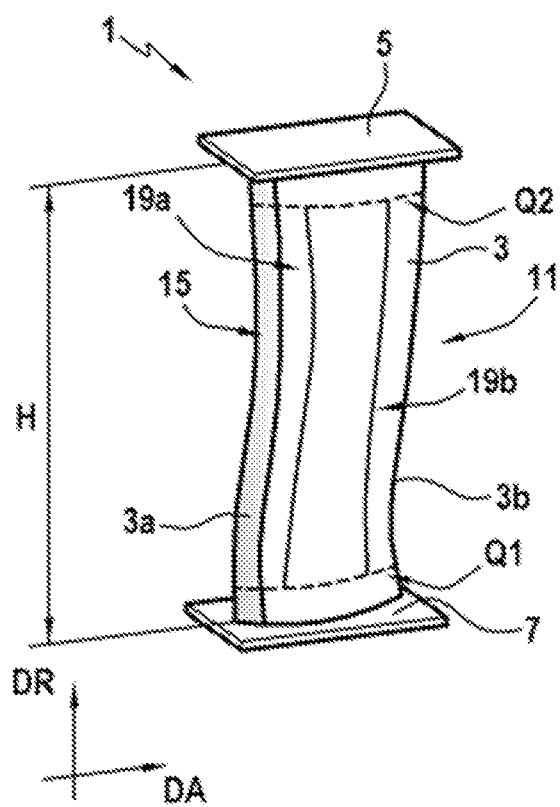

[Fig. 4]
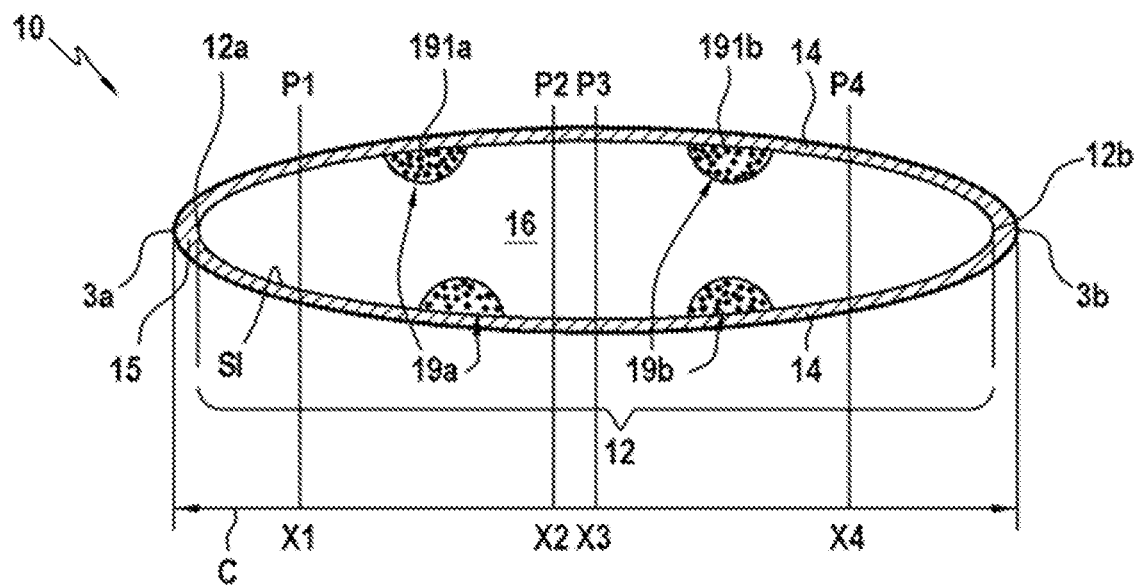
[Fig. 5]
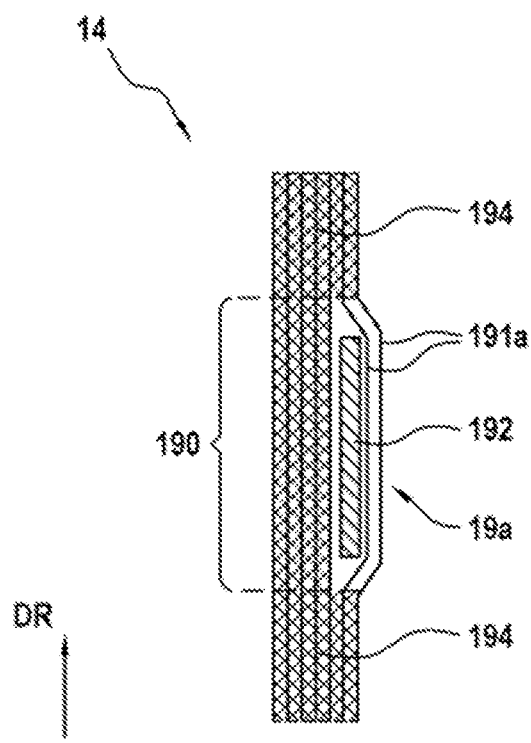

[Fig. 6]
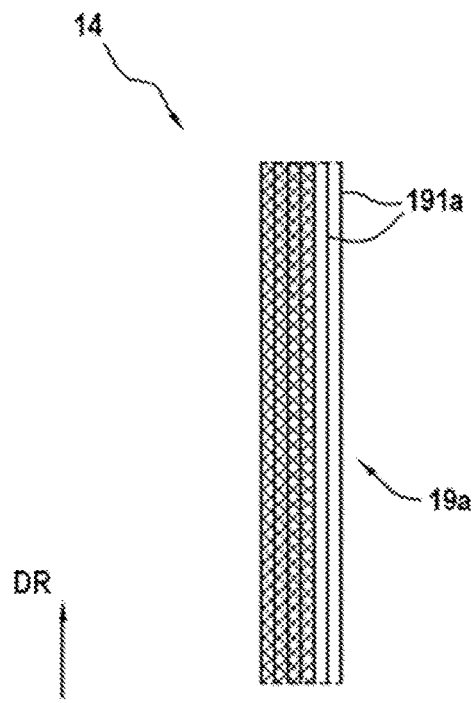
[Fig. 7]
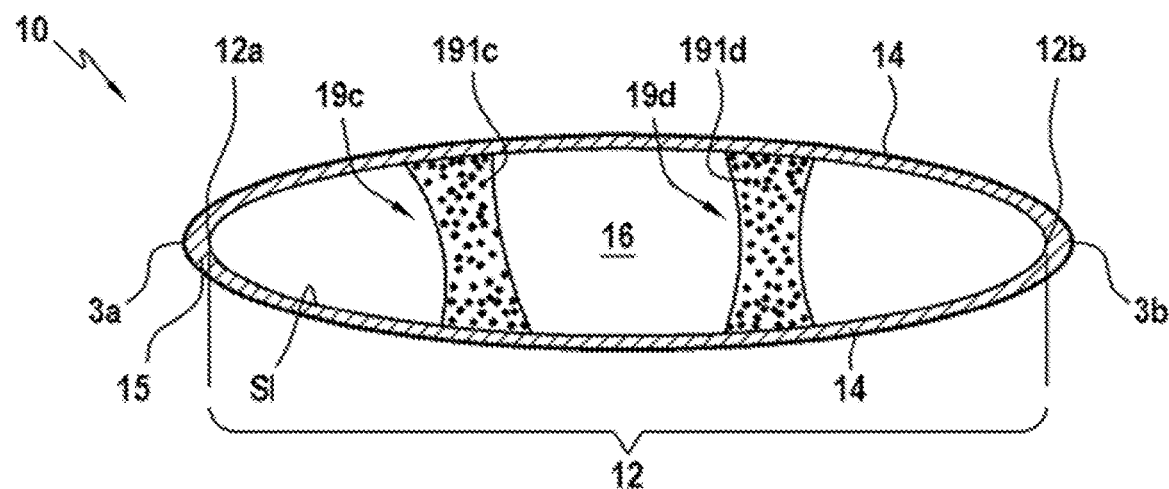

[Fig. 8]
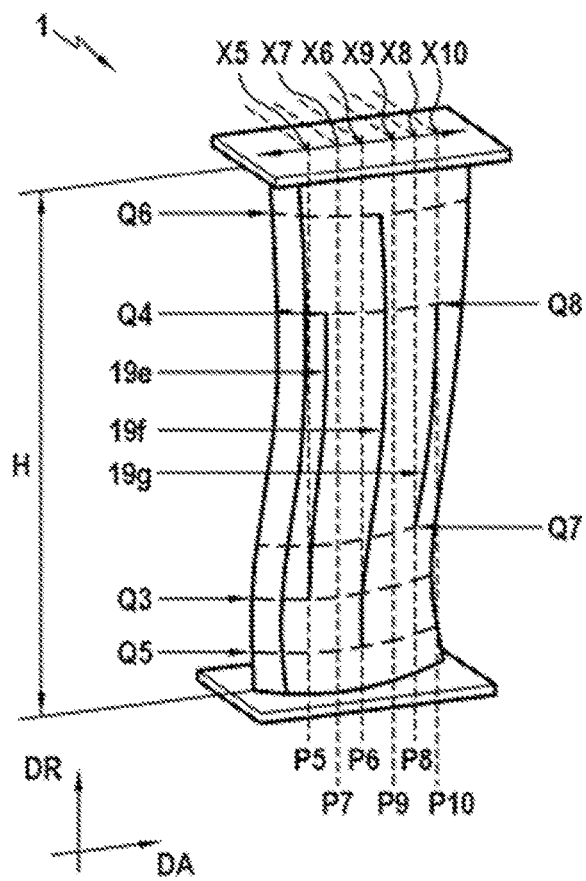
[Fig. 9]
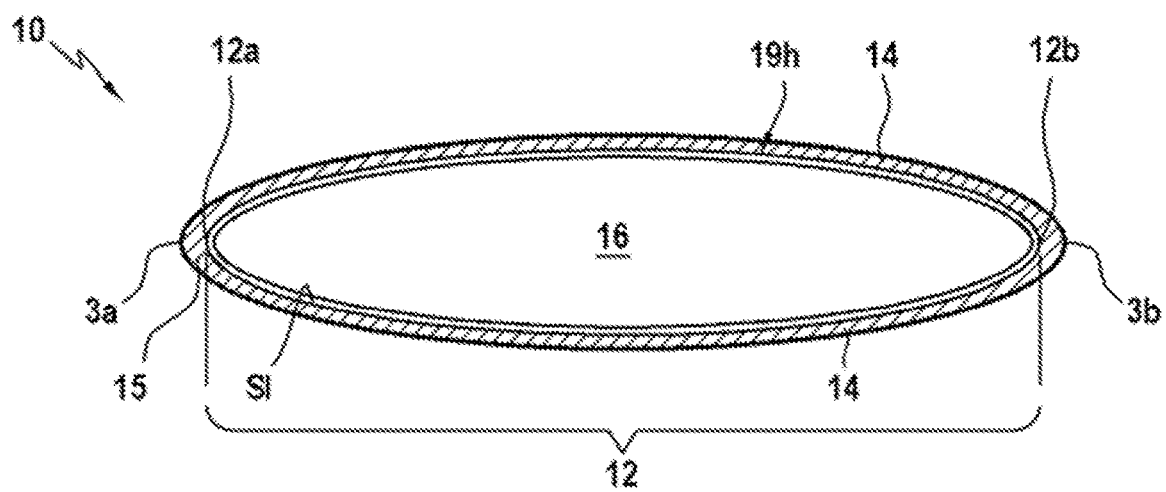

[Fig. 10]
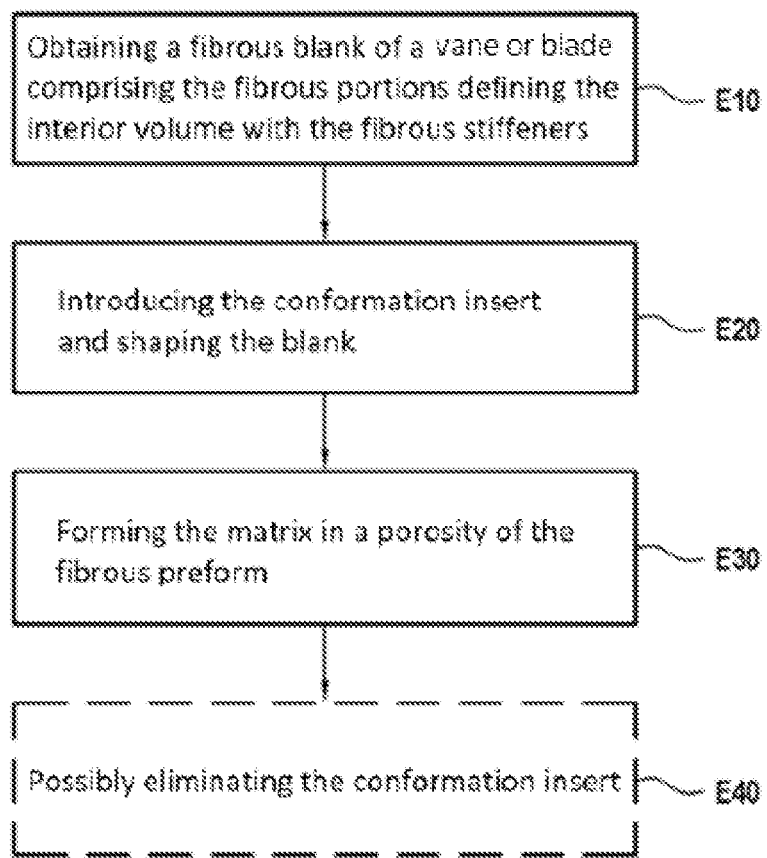

FIBROUS PREFORM WITH STIFFENERS FORMED BY UNIDIRECTIONAL YARN LAYERS

CROSS-REFERENCE TO RELATED APPLICATIONS

This application is the U.S. National Stage of PCT/FR2022/051077, filed Jun. 7, 2022, which in turn claims priority to French patent application number 21 06412 filed Jun. 17, 2021. The content of these applications are incorporated herein by reference in their entireties.

TECHNICAL FIELD

The present invention relates to a fibrous preform intended to form a reinforcement of a turbomachine vane or blade and provided in an interior volume with one or several fibrous stiffeners formed by one or several unidirectional layers of yarns, which make it possible to damp the vibrational modes in operation. The invention is also directed to a method for manufacturing a turbomachine vane or blade comprising the formation of a matrix in a porosity of the fibrous preform.

PRIOR ART

The aircraft parts are commonly made of composite material, comprising a fibrous reinforcement and a matrix present in the porosity of this reinforcement, with the aim of reducing the mass while maintaining good mechanical properties. The fibrous reinforcement can be obtained by three-dimensional weaving or by stacking of strata of a two-dimensional fabric. Document US 2013017093 is particularly known which describes an aircraft propeller airfoil comprising a fibrous reinforcement comprising two fibrous portions forming an aerodynamic profile and defining therebetween an interior volume in which a conformation insert of lower density is present. This solution makes it possible to further reduce the mass while maintaining satisfactory mechanical properties. The issue of reducing the mass and maintaining the mechanical properties by switching to the composite material arises, particularly for the turbomachine vanes or blades, particularly the outlet guide vanes (OGV) or flow straighteners which undergo significant mechanical loads in operation. Document EP 2781694 which discloses a vane made of composite material is known.

It is desirable to provide turbomachine vanes or blades made of composite material having a reduced mass while having optimized mechanical strength, in particular with regard to the vibrational stresses exerted on the part in operation.

DISCLOSURE OF THE INVENTION

The invention relates to a fibrous preform of a turbomachine vane or blade comprising two fibrous portions forming an aerodynamic profile of the vane or blade and defining therebetween an interior volume, in which each fibrous portion has at least one fibrous vibration damping stiffener comprising one or several unidirectional layers of yarns and present in the interior volume.

For the sake of brevity, the expression "fibrous vibration damping stiffener" will hereinafter be referred to as "fibrous stiffener".

The vibrational stresses in operation of the turbomachine can induce undesirable modes within a vane or blade in operation. As such, FIG. 1 illustrates, at four successive instants represented from top to bottom, the displacement of the fibrous portions 14 forming the aerodynamic profile of an outlet guide vane made of composite material under the effect of vibrations encountered in operation. The fibrous portions 14 vibrate in phase opposition with modification of the distance between these portions 14 which was identified by the inventors as being able to damage the part and/or negatively impact the performance of the engine, by the geometric modification of the aerodynamic profiles related to the modifications of the modal deformations in the operating range. In order to respond to this problem, the invention proposes the incorporation of fibrous stiffeners which make it possible to oppose the vibration of the fibrous portions in phase opposition and their relative displacement and to couple their movements, in particular at the level of the vibrational antinodes. The use of unidirectional layers of yarns makes it possible to provide the desired stiffness in order to significantly dampen the problematic vibrational modes in operation, while limiting the disturbances in the textile definition of the fibrous portions in order to reduce the risk for the stiffeners to lead to undesirable textile modifications that could lead to weakening of the material. In one exemplary embodiment, said at least one fibrous stiffener extends along a radial direction of the preform.

As a variant, said at least one fibrous stiffener extends along an axial direction of the preform. It will be noted that there is no departure from the framework of the invention if the fibrous preform has a fibrous stiffener extending along the radial direction, and another fibrous stiffener extending along the axial direction.

In one exemplary embodiment, the fibrous portions are formed by three-dimensional weaving.

Particularly, said at least one fibrous stiffener can be present on a non-interlinked area on which the unidirectional layer(s) of yarns are separated from the corresponding fibrous portion, and the yarns of this or these unidirectional layers can be woven with the corresponding fibrous portion outside the non-interlinked area.

Such a characteristic advantageously contributes to optimizing the bending stiffness of the vane or blade, which is of particular interest for some applications, such as an outlet guide vane.

As a variant, said at least one fibrous stiffener is added onto each fibrous portion. In one exemplary embodiment, said at least one fibrous stiffener extends through the interior volume from one fibrous portion to the other fibrous portion.

Such a characteristic contributes to further improving the damping of the problematic vibrational modes in operation such as the eigenmodes of membranes.

In one exemplary embodiment, each fibrous portion has at least two fibrous vibration damping stiffeners each comprising one or several unidirectional layers of yarns and which are present in distinct regions of the interior volume.

Such a characteristic contributes to further improving the damping of the problematic vibrational modes in operation.

Particularly, each fibrous portion can have a first fibrous stiffener extending along the radial direction and present in a region delimited by the planes of equation $X1=0.15*C$ and $X2=0.45*C$, and a second fibrous stiffener extending along the radial direction and present in a region delimited by the planes of equation $X3=0.50*C$ and $X4=0.80*C$, where C refers to the chord of the vane or blade preform and the coordinates $X1$, $X2$, $X3$ and $X4$ being measured along the axial direction by taking the leading edge as the origin.

Such an example constitutes a first example of one particular arrangement making it possible to optimize the damping of the problematic vibrational modes in operation. Particularly, each fibrous portion can have a first fibrous stiffener extending along the radial direction and present in a region delimited by the planes of equation $X5=0.10*C$ and $X6=0.40*C$, a second fibrous stiffener extending along the radial direction and present in a region delimited by the planes of equation $X7=0.35*C$ and $X8=0.65*C$, and a third fibrous stiffener extending along the radial direction and present in a region delimited by the planes of equation $X9=0.60*C$ and $X10=0.90*C$, where C refers to the chord of the vane or blade preform and the coordinates X5, X6, X7, X8, X9 and X10 being measured along the axial direction by taking the leading edge as the origin.

Such an example constitutes a second example of one particular arrangement making it possible to optimize the damping of the problematic vibrational modes in operation.

The two examples of arrangement described above are applicable to various vane or blade geometries, particularly whether they are mobile or static. Nevertheless, the first arrangement for vanes or blades of reduced chord length may be favored.

In one exemplary embodiment, the fibrous preform is a preform of an outlet guide vane.

The invention also relates to a turbomachine vane or blade comprising a fibrous preform as described above, and a matrix present in a porosity of the fibrous preform.

The vane or blade can be an aircraft turbomachine vane or blade.

The invention also relates to a turbomachine comprising a turbomachine vane or blade described above. The turbomachine can be an aircraft turbomachine.

The invention also relates to a method for manufacturing a turbomachine vane or blade made of composite material, comprising at least:
the formation of a fibrous preform as described above, and
the formation of a matrix in a porosity of the fibrous preform.

In one exemplary embodiment, a conformation insert made of fugitive material is present in the interior volume of the preform, and the method comprises, after the formation of the matrix, the elimination of the conformation insert.

In this case, a hollow vane or blade made of composite material with an empty interior volume is obtained. There is of course no departure from the framework of the invention if the formation insert is not intended to be eliminated but to remain in the vane or blade, for example so as to lighten its mass compared to a monolithic part without interior volume.

BRIEF DESCRIPTION OF THE DRAWINGS

FIG. 1 schematically represents displacements in phase opposition of fibrous portions of an outlet guide vane outside the invention for a vibrational mode in operation, at four successive instants (from top to bottom).

FIG. 2 schematically and partially represents one example of an outlet guide vane according to the invention.

FIG. 3 schematically represents a section of the vane of FIG. 2 along III-III.

FIG. 3A schematically and partially represents the extension of the fibrous stiffeners present in the vane of FIGS. 2 and 3 along the height.

FIG. 4 schematically represents a section of a variant of an outlet guide vane according to the invention.

FIG. 5 schematically represents a detail of the vane of FIG. 4 showing one example of arrangement of the unidirectional layers of yarns of the fibrous stiffener relative to the fibrous portions.

FIG. 6 schematically represents one variant of FIG. 5 showing another example of arrangement of the unidirectional layers of yarns of the fibrous stiffener relative to the fibrous portions.

FIG. 7 schematically represents one variant of the vane of FIG. 4 with fibrous stiffeners passing through the interior volume and extending from one fibrous portion to the other fibrous portion.

FIG. 8 schematically and partially represents one variant of an outlet guide vane according to the invention.

FIG. 9 schematically represents another variant of an outlet guide vane according to the invention.

FIG. 10 schematically represents one example of a flowchart of a method for manufacturing a part according to the invention.

DESCRIPTION OF THE EMBODIMENTS

The invention will be described below and in the appended drawings in application on an outlet guide vane. The invention nevertheless applies to other examples of turbomachine vanes or blades, such as a fan blade, a compressor blade or a turbine blade. It should be particularly noted that the invention can be applied to a static turbomachine vane as well as to a turbomachine blade, for example rotary turbomachine blade.

The following also provides a description of the invention applying to the case of a fibrous preform formed by three-dimensional weaving but there is departure from the framework of the invention when the preform is obtained by other techniques, for example by stacking of two-dimensional fabric strata or of unidirectional layers.

FIG. 2 represents an example of an outlet guide vane 1 according to the invention. This vane 1 is a static turbomachine part which makes it possible to "straighten" the flow at the outlet of the fan in the secondary flow. The vane 1 comprises an aerodynamic profile 3, able to orient the flow towards the downstream of the turbomachine, and platforms 5 and 7 which delimit a flowing path of the flow. The profile 3 extends between a leading edge 3a and a trailing edge 3b along an axial direction DA. The leading edge 3a is located on the upstream side and the trailing edge 3b on the downstream side. The platforms 5 and 7 are spaced apart along a radial direction DR. The profile 3 has, in cross section relative to the radial direction DR, a curved shape of variable thickness between its leading edge 3a and its trailing edge 3b, as schematically represented in FIG. 3.

The vane 1 is made of composite material and comprises a fibrous preform 10 obtained by three-dimensional weaving which is densified by a matrix present in the porosity thereof. The fibrous preform 10 of the turbomachine part 1 corresponds to the fibrous reinforcement 10 thereof and defines the aerodynamic profile. The fibrous preform 10 is in the shape of the vane 1 and is formed by three-dimensional weaving of first and second yarns, in the example illustrated. The formation of the fibrous preform 10 initially comprises the formation of a fibrous blank by three-dimensional weaving by means of a Jacquard type loom on which a bundle of weft yarns has been disposed in a plurality of layers, the weft yarns being connected by warp yarns. By "three-dimensional weaving" or "3D weaving", it is meant here a fabric in which at least some of the warp yarns interlink weft yarns on several weft layers. It will however be noted that, within the framework of the invention, the first yarns can be the warp yarns and the second yarns can be the weft yarns or vice versa, the roles between warp and weft yarns being interchangeable. The fibrous preform may have an "interlock" weave, that is to say a three-dimensional weave whose each layer of first yarns interlinks several layers of second yarns with all the yarns of the same column of first yarns having the same movement in the weave plane. There is no departure from the framework of the invention if another three-dimensional weave is implemented to form the preform. The material of the first and second yarns is chosen depending on the application, the first and second yarns may be made of carbon or of ceramic material, such as silicon carbide or an oxide ceramic.

During the weaving of the fibrous blank corresponding to the illustrated preform, a non-interlinking is performed between two successive layers of second yarns on a non-interlinked area 12. This non-interlinking makes it possible to define two non-interlinked fibrous portions 14 not woven together on the non-interlinked area 12 which can be spaced apart from each other. The fibrous portions 14 define therebetween an interior volume 16, which is here in the form of a pocket 16 or of a cavity 16. Particularly, in the non-interlinked area 12, no layer of yarns from a fibrous portion 14 is woven with a layer of yarns from another fibrous portion 14. In the non-interlinked area 12, no yarn connects at the same time by weaving a layer of yarns from a fibrous portion 14 with a layer of yarns from another fibrous portion 14. The fibrous portions 14 can form fibrous skins, of relatively thin thickness, for example less than or equal to 10 mm, in particular comprised between 2 mm and 10 mm. The fibrous portions 14 are each obtained by three-dimensional weaving in the example illustrated.

The non-interlinked area 12 extends here between a first axial end 12a located on the side of the leading edge 3a up to a second axial end 12b located on the trailing edge 3b. The non-interlinked area 12 can extend over at least 50%, for example at least 75%, of a dimension of the preform, for example of the chord thereof (which corresponds to the distance between the leading edge 3a and the trailing edge 3b). In the example illustrated, the non-interlinked area 12 extends over substantially the entire height of the fibrous preform 10 but there is no departure from the framework of the invention if it only extends over only part of this height. The weaving is continuous outside the non-interlinked area 12 so as to connect the fibrous portions 14 and form a single piece of fabric. The leading edge 3a is here continuously woven so as to connect the two fibrous portions 14 by weaving in a woven area 15. Such continuous weaving at the level of the leading edge 3a is advantageous for reinforcing its resistance to possible impacts. The trailing edge 3b is also here continuously woven so as to connect the two fibrous portions 14 by weaving in a woven area 11. As a variant, the fibrous portions 14 can be connected other than by weaving on the trailing edge 3b. In the illustrated example, radial non-interlinkings can also be performed so as to form the fibrous reinforcement of the platforms 5 to 7 from the fibrous reinforcement of the profile 3.

The interior volume 16 defined by the fibrous portions 14 is intended to accommodate the conformation insert 18 before the formation of the matrix. This insert 18 gives the desired shape to the fibrous preform, and particularly to the aerodynamic profile 3. In the example illustrated, the conformation insert 18 is introduced through a radial end of the fibrous preform which belongs to the non-interlinked area 12. In the preform, the fibrous portions 14 enclose the conformation insert 18. The conformation insert 18 is illustrated here as being made in one piece but there is no departure from the framework of the invention if it is made up of several distinct elements. The conformation insert 18 can be performed by molding or machining in a block of material. The conformation insert 18 here includes ends 18a and 18b rounded to the shape respectively of the leading edge 3a and of the trailing edge 3b. The conformation insert 18 can also comprise a middle portion 18c between the ends 18a and 18b in the shape of at least part of the intrados and extrados of the vane 1.

According to a first example corresponding to FIGS. 2 and 3, the vane 1 which is intended to be mounted in the turbomachine also comprises the conformation insert 18. In this case, a conformation insert 18 of lower density than the density of the fibrous portions 14 densified by the matrix will be advantageously chosen, with a view to lightening the part. The conformation insert 18 can be formed of a porous material, such as foam or a cellular material, for example as described in document WO 2011/083250. The conformation insert 18 can be rigid so as not to deform in operation. According to a second example corresponding to FIG. 4, the vane intended to be mounted in the turbomachine is hollow, the interior volume 16 being empty. In this case, the conformation insert 18 introduced to form the preform was removable or made of fugitive material and was eliminated after densification by the matrix.

As indicated above, fibrous stiffeners have been integrated into the preform in order to improve the resistance of the vane to vibrational stresses in operation and thus increase its lifespan. The following describes details relating to these fibrous stiffeners according to several exemplary embodiments.

As such, FIGS. 3, 3A and 4 illustrate a first example of fibrous stiffeners that can be used within the framework of the invention. The case of FIGS. 3 and 3A only differs from the case of FIG. 4 in that the insert 18 is or is not present in the vane. In the example illustrated, each fibrous portion 14 has two fibrous stiffeners 19a-19b which are present in distinct regions of the interior volume 16. The invention is however not limited to this precise number of stiffeners. According to one variant, each fibrous portion may have more than two fibrous stiffeners, evenly spaced or not, for example at least three or four fibrous stiffeners. As a variant, each fibrous portion has only one fibrous stiffener.

Each fibrous stiffener 19a-19b is formed of several unidirectional layers of yarns 191a-191b that is to say by several layers of yarns 191a-191b which extend substantially in the same direction. There is no departure from the framework of the invention if the fibrous stiffeners comprise only one unidirectional layer. The yarns 191a-191b are not woven or interlinked together in each fibrous stiffener 19a-19b. The yarns 191a-191b are present in the interior volume 16, on an inner surface SI of the fibrous portions 14 delimiting this interior volume 16. The example illustrated concerns the case of fibrous stiffeners 19a-19b whose yarns 191a-191b extend along the radial direction DR. An orientation of the unidirectional layers along the axial direction DA is also possible and will be discussed below in relation to FIG. 9. In the example of FIGS. 3 and 4, the fibrous stiffeners 19a-19b form reliefs protruding from the fibrous portions 14 in the interior volume 16. The yarns 191a-191b are arranged in each stiffener 19a-19b so as to provide a variable thickness to the latter with possibly a maximum thickness positioned in a region of maximum relative displacement of the fibrous portions 14 associated with a vibrational mode of the vane in operation.

Those skilled in the art will recognize that the number and positioning of the stiffeners 19a-19b depends on the part and on the vibrational stresses encountered in operation and will be able to seek a compromise between the desired damping effect and the control of the mass of the vane incorporating the stiffeners.

In order to optimize the damping, it is possible to position each fibrous stiffener 19a-19b in a region comprising an antinode of the vibrational mode and delimited by planes whose positions correspond to amplitudes of relative displacement of the fibrous portions 14 equal to 20% of an amplitude of said antinode.

According to one example, each fibrous portion 14 may have (i) a first fibrous stiffener 19a present in a region delimited by the planes P1 and P2 respectively of equation $X1=0.15*C$ and $X2=0.45*C$, and (ii) a second fibrous stiffener 19b present in a region delimited by the planes P3 and P4 respectively of equation $X3=0.50*C$ and $X4=0.80*C$, where C refers to the chord of the vane or blade or of the preform of the vane or blade and the coordinates X1, X2, X3 and X4 are measured along the axial direction DA by taking the leading edge 3a as the origin. The majority (more than 50%), if not all, of the yarns 191a of the first fibrous stiffener 19a can be present between planes P1 and P2. The majority (more than 50%), if not all, of the yarns 191b of the second fibrous stiffener 19b can be present between the planes P3 and P4.

It will be noted that fibrous stiffeners present on two distinct fibrous portions 14 can face each other (the first fibrous stiffeners 19a face each other as well as the second fibrous stiffeners 19b in the example illustrated). These fibrous stiffeners 19a or 19b can be present on the same plane orthogonal to the axial direction DA.

The yarns 191a-191b of the unidirectional layers (or the stiffeners 19a and 19b) can each extend over at least 50% of the height H of the fibrous preform or of the vane or blade, or even over at least 75% of this height. Unless otherwise stated, the height of the vane or blade is measured along the radial direction DR.

According to one example and as illustrated in FIG. 3A, the yarns 191a-191b can extend at least from plane Q1 to plane Q2 where the planes Q1 and Q2 are respectively of equation $Y1=0.1*H$ and $Y2=0.9*H$, with possibly $Y1=0.05*H$ and/or $Y2=0.95*H$, H referring to the height of the vane or blade or of the preform of the vane or blade and the coordinates Y1 and Y2 being measured along the radial direction DR by taking as origin the inner radial end of the vane or blade or of the vane or blade preform.

FIGS. 5 and 6 which will now be described show two variants of integration of the fibrous stiffeners 19a-19b into the textile of the fibrous preform of the vane. These variants apply equivalently, whatever the number or position of the stiffeners. In the example illustrated in FIG. 5, the yarns 191a can be co-woven with the fibrous portions 14 in the woven areas 194 and separated therefrom in a non-interlinked area 190. The non-interlinked area 190 is located between the woven areas 194. The woven areas 194 can form a single piece of fabric. The non-interlinking 190 is here performed along the radial direction DR but the same principle remains applicable to the case of stiffeners extending along the axial direction DA as described below. Thus in the example of FIG. 5, the non-interlinked area 190 is performed during the weaving of the blank in order to exit the yarns 191a and form the stiffener 19a. The integration of the stiffeners therefore does not require any additional step after weaving. In this case, an insert 192 can be positioned to hold the yarns 191a in place during the formation of the matrix, which insert can be advantageously made of fugitive material in order to be eliminated after formation of the matrix. In the variant of FIG. 6, the yarns 191a are added onto the corresponding fibrous portion 14 after its formation. They can be held by gluing for example or mechanically before formation of the matrix. FIGS. 5 and 6 illustrate the case of the yarns 191a of the stiffener 19a but remain of course applicable whatever the stiffener, and particularly for the stiffener 19b.

The examples which have just been described, in relation to FIGS. 3 to 6, concern fibrous stiffeners 19a-19b which do not extend from one fibrous portion 14 to another. FIG. 7 illustrates a variant in which the fibrous stiffeners 19c and 19d comprising unidirectional layers of yarns 191c-191d extending through the interior volume 16 from one fibrous portion 14 to the other fibrous portion 14. Those skilled in the art will favor the use of a through stiffener such as that in FIG. 7 or non-through stiffener as illustrated in FIGS. 3 and 4 depending on the compromise sought between the damping of the vibrations and the control of the mass of the vane. The use of through stiffeners 19c and 19d can be favored for large vane s or blades, such as fan blades. For smaller geometries, non-through stiffeners of the type of those illustrated in FIGS. 3 and 4 can be favored. FIG. 7 illustrates a case without a conformation insert 18 but, according to one variant not illustrated, a conformation insert in several parts can be present in the interior volume 16.

Examples in which each fibrous portion 14 has two fibrous stiffeners have just been described in relation to FIGS. 3 to 7. The example in FIG. 8 which will now be described concerns a variant in which each fibrous portion 14 has three fibrous stiffeners.

In the example of FIG. 8, each fibrous portion 14 has three fibrous stiffeners 19e, 19f and 19g which can each have a structure as described above. According to one example, each fibrous portion 14 can have (i) a first fibrous stiffener 19e present in a region delimited by the planes P5 and P6 respectively of equation $X5=0.10*C$ and $X6=0.40*C$, (ii) a second fibrous stiffener 19f present in a region delimited by the planes P7 and P8 respectively of equation $X7=0.35*C$ and $X8=0.65*C$, and (iii) a third fibrous stiffener 19g present in a region delimited by the planes P9 and P10 respectively of equation $X9=0.60*C$ and $X10=0.90*C$, where C refers to the chord of the vane or blade or the preform of the vane or blade. The coordinates X5, X6, X7, X8, X9 and X10 are measured along the axial direction DA by taking the leading edge 3a as the origin.

According to one example, the following characteristics can also be verified:
- the yarns of the unidirectional layer(s) of the first stiffener 19e can extend at least from plane Q3 to plane Q4 where the planes Q3 and Q4 are respectively of equation $Y3=0.2*H$ and $Y4=0.7*H$, with possibly Y3 able to vary between $0.00*H$ and $0.40*H$ and/or Y4 able to vary between $0.50*H$ and $0.90*H$,
- the yarns of the unidirectional layer(s) of the second stiffener 19f can extend at least from plane Q5 to plane Q6 where the planes Q5 and Q6 are respectively of equation $Y5=0.1*H$ and $Y6=0.9*H$, with possibly Y5 able to vary between $0.05*H$ and $0.1*H$ and/or Y6 able to vary between $0.90*H$ and $0.95*H$, and
- the yarns of the unidirectional layer(s) of the third stiffener 19g can extend at least from plane Q7 to plane Q8 where the planes Q7 and Q8 are respectively of equation $Y7=0.3*H$ and $Y8=0.7*H$, with possibly Y7 able to vary between 0.10*H and 0.50*H, and/or Y8 able to vary between 0.50*H and 0.90*H, where H refers to the height of the vane or blade or of the vane or blade preform and the coordinates Y3, Y4, Y5, Y6, Y7 and Y8 are measured along the radial direction DR by taking as origin the inner radial end of the vane or blade or of the vane or blade perform.

FIG. 9 represents the case of a fibrous stiffener 19h extending along the axial direction DA of the preform. Analogously to what was described above, it is possible to have several fibrous stiffeners extending along the axial direction DA and disposed at different heights of the vane or blade preform.

In order to optimize the damping, each fibrous portion 14 can have at least one fibrous stiffener 19h present in a region delimited by the planes P5 and P6 defined above and/or at least one fibrous stiffener 19h present in a region delimited by the planes P7 and P8 defined above and/or at least one fibrous stiffener 19h present in a region delimited by the planes P9 and P10 defined above. As a variant, each fibrous portion 14 can have at least one fibrous stiffener 19h present in a region delimited by the planes P1 and P2 defined above and/or at least one fibrous stiffener 19h present in a region delimited by the planes P3 and P4 defined above. The fibrous stiffeners 19e can extend over more than 50% of the chord of the vane or blade or of the preform, as illustrated.

Different possible structures for vanes or blades and vane or blade preforms according to the invention have just been described. The following focuses on describing details relating to the vane or blade manufacturing method that can be implemented within the framework of the invention.

FIG. 10 is a flowchart of an example of a method according to the invention. In a first step E10, a fibrous blank of the vane or blade is obtained. The blank can be obtained by three-dimensional weaving or by stacking of strata of two-dimensional fabric or of unidirectional layers. The blank comprises the fibrous stiffeners described above. As indicated above, these stiffeners can be formed during the weaving of the blank by performing an exit of yarns 191a on a non-interlinked area 190 (example of FIG. 5) or be integrated after obtaining the blank by adding them onto the fibrous portions (example in FIG. 6). The blank is then shaped with the introduction of the conformation insert 18 into the interior volume 16 (step E20). The fibrous portions 14 enclose the conformation insert 18 and take its shape to define the aerodynamic profile. The conformation insert 18 can be intended to be eliminated after formation of the matrix in order to obtain a hollow vane or blade, or be present in the vane or blade intended to be mounted in the turbomachine. Once the blank has been shaped and the conformation insert 18 has been introduced, the matrix is formed in the porosity thereof by a method known per se (step E30). For example, in the case where the part is made of organic matrix composite, the formation of the matrix can comprise the injection of a resin into the porosity of the preform and the baking, for example the crosslinking thereof, so as to form the matrix. The matrix is formed in the porosity of the fibrous portions 14 as well as around the yarns 191a-191d of the unidirectional layers and in the inter-yarn spaces. There is no departure from the framework of the invention when the matrix is not made of organic material but of ceramic material, for example in the case where the vane or blade is intended to be mounted in the hot part of a turbomachine, for example in the case of a turbine blade. In this case, the ceramic matrix can be formed by Chemical Vapor Infiltration (CVI), by Melt-Infiltration (MI) or by Polymer Impregnation and Pyrolysis (PIP). The techniques for forming the matrix are known per se and do not need to be further detailed.

After formation of the matrix, the conformation insert 18 can be eliminated if desired, for example by fusion or dissolution by a solvent (optional step E40), or simply remove the insert. A finishing machining or treatments are also performed, if desired, after the formation of the matrix in order to obtain the vane or blade ready to be mounted in the turbomachine.

The expression "comprised between . . . and . . . " must be understood as including the bounds.

The invention claimed is:

1. A fibrous preform of a turbomachine vane or blade comprising two fibrous portions formed by three-dimensional weaving and forming an aerodynamic profile of the vane or blade and defining therebetween an interior volume, wherein each fibrous portion has at least one fibrous vibration damping stiffener comprising one or several unidirectional layers of yarns and present in the interior volume, and wherein said at least one fibrous stiffener is present on a non-interlinked area on which the unidirectional layer(s) of yarns are separated from the corresponding fibrous portion, and wherein the yarns of this or these unidirectional layers are woven with the corresponding fibrous portion outside the non-interlinked area, or wherein said at least one fibrous stiffener is added onto each fibrous portion.

2. The fibrous preform according to claim 1, wherein said at least one fibrous stiffener extends along a radial direction of the preform.

3. The fibrous preform according to claim 1, wherein said at least one fibrous stiffener extends along an axial direction of the preform.

4. The fibrous preform according to claim 1, wherein said at least one fibrous stiffener extends through the interior volume from one fibrous portion to the other fibrous portion.

5. The fibrous preform according to claim 1, wherein each fibrous portion has at least two fibrous vibration damping stiffeners each comprising one or several unidirectional layers of yarns and which are present in distinct regions of the interior volume.

6. The fibrous preform according to claim 5, wherein each fibrous portion has a first fibrous stiffener extending along the radial direction and present in a region delimited by the planes of equation X1=0.15*C and X2=0.45*C, and a second fibrous stiffener extending along the radial direction and present in a region delimited by the planes of equation X3=0.50*C and X4=0.80*C, where C refers to the chord of the vane or blade preform and the coordinates X1, X2, X3 and X4 being measured along the axial direction by taking the leading edge as the origin.

7. The fibrous preform according to claim 5, wherein each fibrous portion has a first fibrous stiffener extending along the radial direction and present in a region delimited by the planes of equation X5=0.10*C and X6=0.40*C, a second fibrous stiffener extending along the radial direction and present in a region delimited by the planes of equation X7=0.35*C and X8=0.65*C; and a third fibrous stiffener extending along the radial direction and present in a region delimited by the planes of equation X9=0.60*C and X10=0.90*C, where C refers to the chord of the vane or blade preform and the coordinates X5, X6, X7, X8, X9 and X10 being measured along the axial direction by taking the leading edge as the origin.

8. The fibrous preform according to claim 1, wherein the fibrous preform is a preform of an outlet guide vane.

9. The turbomachine vane or blade comprising the fibrous preform according to claim 1, and a matrix present in a porosity of the fibrous preform.

10. A method for manufacturing the turbomachine vane or blade made of composite material, comprising:

forming the fibrous preform according to claim 1, and
   forming a matrix in a porosity of the fibrous preform.

11. The method according to claim 10, wherein a conformation insert made of fugitive material is present in the interior volume of the preform, and the method comprising, after forming the matrix, eliminating the conformation insert.

* * * * *